United States Patent Office.

IMPROVED PROCESS FOR MANUFACTURE OF GLASS.

HAYDN M. BAKER, OF ROCHESTER, NEW YORK, ASSIGNOR TO HIMSELF AND ROBERT J. LESTER.

Letters Patent No. 60,119, dated December 4, 1866.

SPECIFICATION.

TO ALL WHOM IT MAY CONCERN:

Be it known that I, HAYDN M. BAKER, of Rochester, in the county of Monroe, and State of New York, have invented a new and useful process for the Manufacture of the Best Flint Glass, which I verily believe has not before been known or used, and that the following is a full and exact description thereof.

The nature of my invention consists of the use of a mixture of sand, nitrate of lead, and nitrate of potash, in any desirable proportions, and the fluxing of the same in a clay retort, provided with suitable condensing apparatus for the condensation of the nitric acid evolved from the nitrate of lead and nitrate of potash, the said condensing apparatus being also provided with an apparatus, (guarded with a steam-valve,) for the injection of steam for the purpose of transforming any nitrous vapors that may form into nitric vapors. The nitric acid recovered is used to treat oxide of lead, (forming again nitrate of lead,) and chloride of potassium or carbonate of potash, forming nitrate of potash; the said lead and potash nitrates being used after recrystallization with a new quantity of sand for the production of a new batch of glass.

To enable manufacturers to make use of my invention, I will proceed to describe it more particularly.

I take for the very best quality of flint glass, 1,200 lbs. of sand (said sand having been previously washed with muriatic acid and afterwards with pure water,) and mix the same with 1,223 lbs. of recrystallized nitrate of lead and 670 lbs. of recrystallized nitrate of potash, and charge the resulting product into a clay retort capable of receiving and sustaining a very elevated temperature. The retort is now connected with the condensing apparatus and transmitted heat or caloric applied until the silicic acid, (sand,) has displaced all the nitric acid from the oxide of lead and potash, leaving in the retort a very plain and pure crystal glass, which may be worked out and formed into ware. One portion of the recovered nitric acid is now used with litharge to form nitrate of lead again, and the said nitrate of lead dissolved in water, evaporated and recrystallized, is now ready for admixture with sand and nitrate of potash for the production of a new batch of glass. The remaining portion of the nitric acid aforesaid is used, in conjunction with chloride of potassium, for the purpose of forming nitrate of potash again, or the same may be used with carbonate of potash, and the resulting nitrate of potash recrystallized and used in the production of a new batch.

The advantages of this invention are, that it enables the manufacturer to produce a very excellent quality of glass, at a very much more moderate rate than by any process heretofore known. It is well known to manufacturers that the presence of any metallic oxides in glass, (except oxide of lead and oxide of bismuth,) imparts to the glass a tinge or color peculiar to the metal present, and that with many of them this effect is produced when the quantities present are exceedingly trifling. By using crystallized nitrate of lead, all the impurities which usually accompany lead, are left in the "mother liquors," as uncrystallized nitrates. The same is true with the nitrate of potash. By this process, therefore, the manufacturer is enabled to use nearly chemically pure material, consequently must obtain a glass nearly colorless, which is the object to be attained.

Claim.

What I claim as my invention, and desire to secure by Letters Patent, is—

The application to manufacture of the processes herein described for the production of best flint glass, from a mixture of nitrate of potash, nitrate of lead, and silicic acid, at elevated temperatures, and the recovery of the nitric acid employed by displacement and distillation in the manner herein described and set forth, or any other process substantially the same, and which produces the same intended effects or results.

HAYDN M. BAKER.

Witnesses:
DE L. CRITTENDEN,
W. H. TRUESDALE.